(12) United States Patent
Thoukydides et al.

(10) Patent No.: US 10,049,000 B2
(45) Date of Patent: Aug. 14, 2018

(54) METHOD AND APPARATUS FOR PARTIAL PACKET RECOVERY DURING WLAN SCANNING

(71) Applicant: Samsung Electronics Co., Ltd., Gyeonggi-do (KR)

(72) Inventors: Alexander Thoukydides, Cambridgeshire (GB); Clive Douglas Woon Feather, Cambridge (GB)

(73) Assignee: Samsung Electronics Co., Ltd (KR)

( * ) Notice: Subject to any disclaimer, the term of this patent is extended or adjusted under 35 U.S.C. 154(b) by 150 days.

(21) Appl. No.: 14/980,997

(22) Filed: Dec. 28, 2015

(65) Prior Publication Data

US 2017/0185474 A1   Jun. 29, 2017

(51) Int. Cl.
| | | |
|---|---|---|
| *G06F 11/00* | (2006.01) | |
| *G06F 11/07* | (2006.01) | |
| *H04L 29/08* | (2006.01) | |

(52) U.S. Cl.
CPC ...... *G06F 11/0793* (2013.01); *G06F 11/0709* (2013.01); *G06F 11/079* (2013.01); *G06F 11/0751* (2013.01); *H04L 67/2842* (2013.01)

(58) Field of Classification Search
CPC ............. G06F 11/0793; G06F 11/0709; G06F 11/0751; G06F 11/079; H04L 1/004; H04L 1/0083

See application file for complete search history.

(56) References Cited

U.S. PATENT DOCUMENTS

| | | | | |
|---|---|---|---|---|
| 5,007,051 A | * | 4/1991 | Dolkas | H04L 1/0041 370/235 |
| 2005/0220110 A1 | * | 10/2005 | Agarwal | H04L 1/0041 370/392 |
| 2008/0310379 A1 | * | 12/2008 | Lim | H04W 24/00 370/338 |
| 2009/0228764 A1 | * | 9/2009 | Lee | H03M 13/27 714/776 |
| 2014/0112266 A1 | * | 4/2014 | Seok | H04W 74/04 370/329 |

* cited by examiner

*Primary Examiner* — Bryce P Bonzo
*Assistant Examiner* — Katherine Lin
(74) *Attorney, Agent, or Firm* — The Farrell Law Firm, P.C.

(57) ABSTRACT

Methods and apparatuses are provided for recovering data transmitted to a terminal. A processor of the terminal selects a plurality of candidate frames expected to include the data from a memory of the terminal. Each of the plurality of candidate frames is received by the terminal and includes one or more errors. The processor compares corresponding values, for each of a plurality of bit sets, in the plurality of candidate frames. Specified fields of the plurality of candidate frames are excluded from comparison. The processor recovers the data based on the comparison.

17 Claims, 11 Drawing Sheets

METHOD AND APPARATUS FOR PARTIAL PACKET RECOVERY DURING WLAN SCANNING

BACKGROUND

1. Field of the Disclosure

The present disclosure relates generally to packet data recovery, and more particularly, to methods and apparatuses for recovering data using probe response frames or beacon frames received with errors.

2. Description of the Related Art

A wireless local area network (WLAN) device that is based on the Institute of Electrical and Electronics Engineers (IEEE) 802.11 standard relies on the correct reception of frames from neighboring devices in order to identify available networks. This reception is required prior to attempting to establish a connection to one of the available networks. This reception is also required to determine the location of the WLAN device, especially in areas where it is not possible to receive positioning signals from navigation satellites.

Interference caused by an increased deployment and usage of license-exempt industrial scientific and medical (ISM) band devices results in the incorrect reception of frames. Incorrect reception reduces the number of devices that are discovered within a fixed duration, resulting in either reduced reliability or increased power consumption.

Two approaches for scanning for networks are set forth in IEEE 802.11. In a first approach, referred to as passive scanning, the receiver is enabled for a fixed duration and picks up beacon frames that are broadcast by each network. The beacon frames are typically transmitted every 100 time units (TUs) or 102.4 ms. Thus, the receiver must remain enabled on each channel for a time that is slightly longer than 102.4 ms.

In a second approach, referred to as active scanning, a probe request is broadcast and then the receiver awaits a probe response that is unicast back to the device from each network. Active scanning reduces the amount of time that must be spent on each channel to approximately 5 ms. However, this amount of time is normally increased if other traffic is detected to allow for delayed or multiple responses.

Beacon frames are always broadcast, and therefore, automatic repeat request (ARQ) is not applied. This typically means that there is only a single opportunity to receive a beacon during the dwell time on each channel during passive scanning. It is not possible to request a retransmission of the packet if it is not successfully received.

Probe response frames are unicast to the device that transmitted the probe request, and therefore, they benefit from ARQ. If they are addressed to the scanning device, there will typically be up to seven opportunities to receive the frame. However, if the scanning device is attempting to receive a probe response addressed to a different device, there may be fewer retransmissions.

The IEEE 802.11 standard uses three main frame types: management, data, and control. Each frame type includes a medium access control (MAC) header, which is followed by a frame body, which is followed by a frame check sequence (FCS). The IEEE 802.11 standard specifies that frames received with an invalid FCS should be discarded. However, these partially received frames often contain useful information despite the errors.

SUMMARY

The present disclosure has been made to address at least the above problems and/or disadvantages and to provide at least the advantages described below. Accordingly, an aspect of the present disclosure provides techniques for recovering data between transmissions or retransmissions of probe response frames, or between successive beacon frames broadcast by the same device.

According to an aspect of the present disclosure, a method is provided for recovering data transmitted to a terminal. A processor of the terminal selects a plurality of candidate frames expected to include the data from a memory of the terminal. Each of the plurality of candidate frames is received by the terminal and includes one or more errors. The processor compares corresponding values, for each of a plurality of bit sets, in the plurality of candidate frames. Specified fields of the plurality of candidate frames are excluded from comparison. The processor recovers the data based on the comparison.

According to another aspect of the present disclosure, an apparatus is provided for recovering data transmitted to a terminal. The apparatus includes a memory configured to store received frames. The apparatus also includes a processor coupled to the memory and configured to select a plurality of candidate frames expected to include the data from the memory. Each of the plurality of candidate frames includes one or more errors. The processor is also configured to compare corresponding values, for each of a plurality of bit sets, in the plurality of candidate frames. Specified fields of the plurality of candidate frames are excluded from comparison. The processor is further configured to recover the data based on the comparison.

According to a further aspect of the present disclosure, a non-transitory computer readable medium is provided with computer executable instructions stored thereon executed by a processor to perform the method of recovering data transmitted to a terminal. The method includes selecting a plurality of candidate frames expected to include the data. Each of the plurality of candidate frames is received by the terminal and includes one or more errors. The method also includes comparing corresponding values, for each of a plurality of bit sets, in the plurality of candidate frames. Specified fields of the plurality of candidate frames are excluded from comparison. The method further includes recovering the data based on the comparison.

BRIEF DESCRIPTION OF THE DRAWINGS

The above and other aspects, features and advantages of the present disclosure will be more apparent from the following description when taken in conjunction with the accompanying drawings, in which.

DETAILED DESCRIPTION OF EMBODIMENTS OF THE PRESENT DISCLOSURE

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms and words used in the following description and claims are not limited to their dictionary meanings, but are merely used to enable a clear and consistent understanding of the invention. Accordingly, it should be apparent to those skilled in the art that the following description of embodiments of the present disclosure are provided for illustrative purposes only and not for the purpose of limiting the invention, as defined by the appended claims and their equivalents.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

It is to be understood that the singular forms "a," "an," and "the" include plural referents unless the context clearly dictates otherwise. Thus, for example, reference to "an identifier" includes reference to one or more such identifiers.

In the present disclosure, it should be understood that the terms "include" or "have" indicate existence of a feature, a number, a step, an operation, a structural element, parts, or a combination thereof, and do not exclude the existence or probability of additional one or more other features, numerals, steps, operations, structural elements, parts, or combinations thereof.

Figure 1:
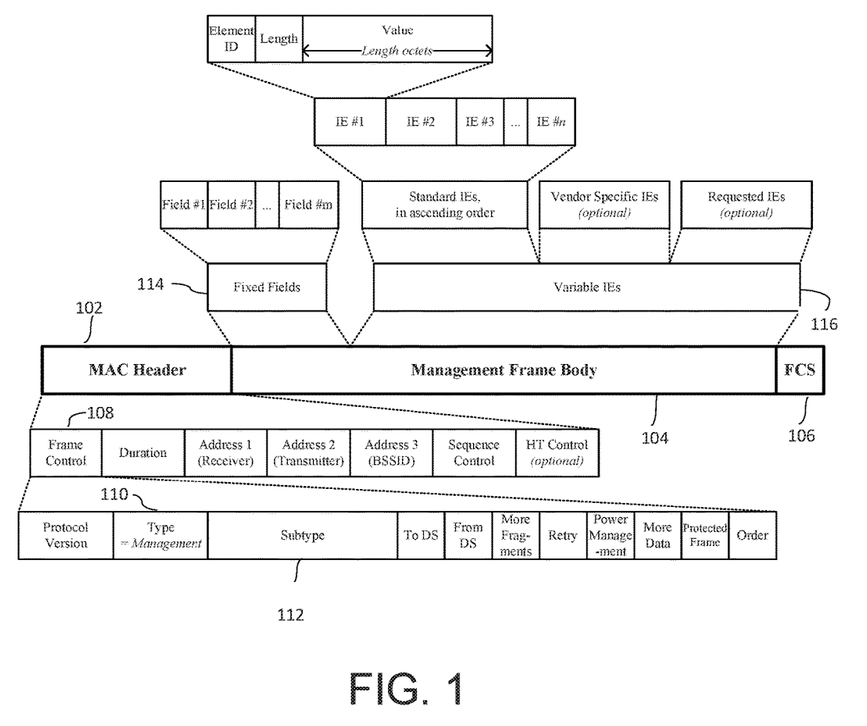
FIG. 1 is a diagram illustrating a management frame of the IEEE 802.11 standard.

Referring initially to FIG. 1, a diagram illustrating a management frame of the IEEE 802.11 standard. The management frame includes a MAC header 102, a frame body 104, and an FCS 106. The first field within the MAC header 102 is a frame control 108, which specifies a type 110 and a subtype 112 of the frame. The frame body 104 starts with a sequence of fixed fields 114 followed by a series of variable information elements (IEs) 116.

The IEEE 802.11 standard defines several management frame subtypes. For each subtype, the IEEE 802.11 standard specifies the fixed fields that are present, and which always occupy the same octets within the frame body of frames of the subtype. The IEEE 802.11 standard also specifies which IEs may be included in each subtype, and the conditions under which each IE is required or optional. The IEs have a tag-length-value (TLV) format. Each IE starts with element identifier (ID) and length fields, followed by the specified number of octets of data.

The IEs are generally required to appear in order of ascending element ID. Therefore, within a particular frame subtype, the IEs occur in a known order. An arbitrary number of vendor specific IEs and requested IEs (in probe response frames only) may be included in the management frame body, but should always appear after the IEs specified by the IEEE 802.11 standard.

With respect to active scanning, the most important management frame subtype is the probe response. The probe response frame provides details of a particular basic service set (BSS) such as its service set identifier (SSID). One device in each BSS, such as an AP in an infrastructure BSS, transmits a unicast probe response in response to each matching probe request that it receives. In a congested environment having many BSSs and stations (STAs) scanning for them, a large number of probe response frames are transmitted. The term "station", as used herein, is known by those skilled in the art as defined in the IEEE 802.11 standard, and may also be referred to as a device or a terminal.

Figure 2:
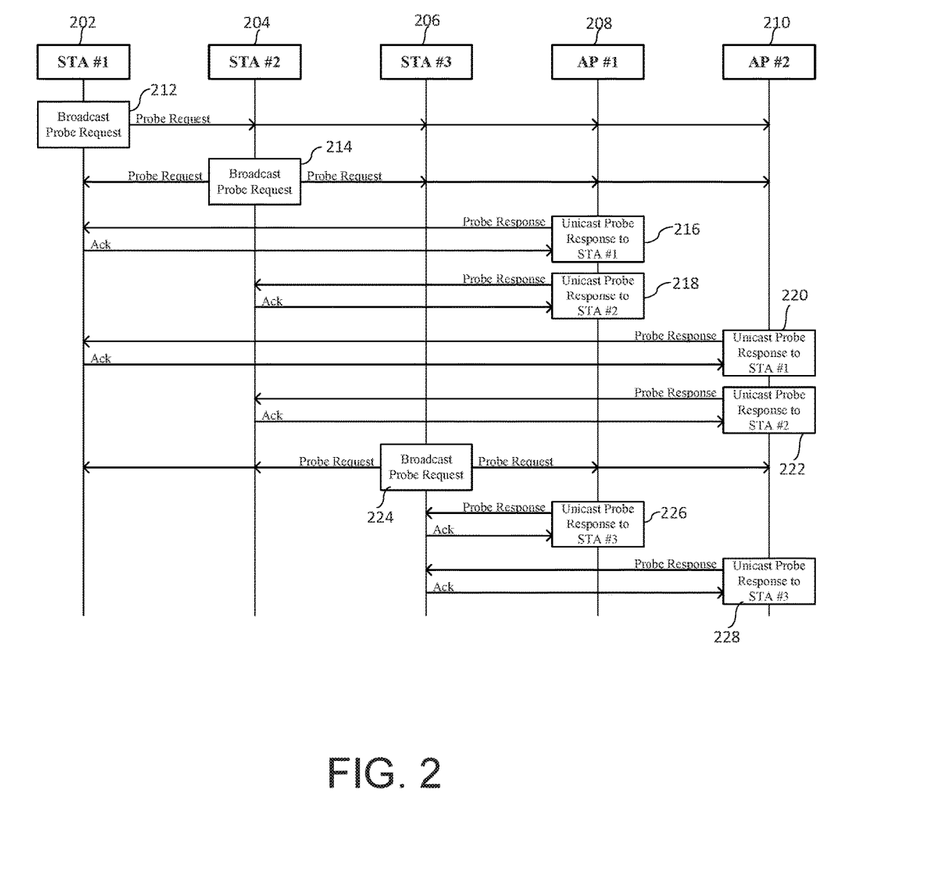
FIG. 2 is a diagram illustrating probe request and probe response transmissions between stations and APs.

FIG. 2 is a diagram illustrating probe request and probe response transmissions between stations and APs. A first station 202 broadcasts a first probe request 212 to each of a second station 204, a third station 206, a first AP 208, and a second AP 210. The second station 204 broadcasts a second probe request to each of the first station 202, the third station 206, the first AP 208, and the second AP 210. The first AP 208 unicasts a first probe response 216 to the first station 202, and the first station 202 responds with an ACK. The first AP 208 also unicasts a second probe response 218 to the second station 204, and the second station 204 responds with an ACK. The second AP 210 unicasts a third probe response 220 to the first station 202, and the first station 202 responds with an ACK. The second AP 210 also unicasts a fourth probe response 222 to the second station 204, and the second station 204 responds with an ACK.

The third station 206 broadcasts a third probe request 224 to each of the first station 202, the second station 204, the first AP 208, and the second AP 210. The first AP 208 unicasts a fifth probe response 226 to the third station 206, and the third station 206 responds with an ACK. The second AP 210 unicasts a sixth probe response 228 to the third station 206, and the third station 206 responds with an ACK.

In practice, the situation is worse than that which is illustrated in FIG. 2. Many probe response frames are not correctly received by their intended recipient, and thus, the AP retransmits each probe response until it receives a positive acknowledgement, or until the AP reaches its retry limit. Thus, the incorrect reception of probe response frames significantly increases the total number of transmitted probe response frames.

Figure 3:
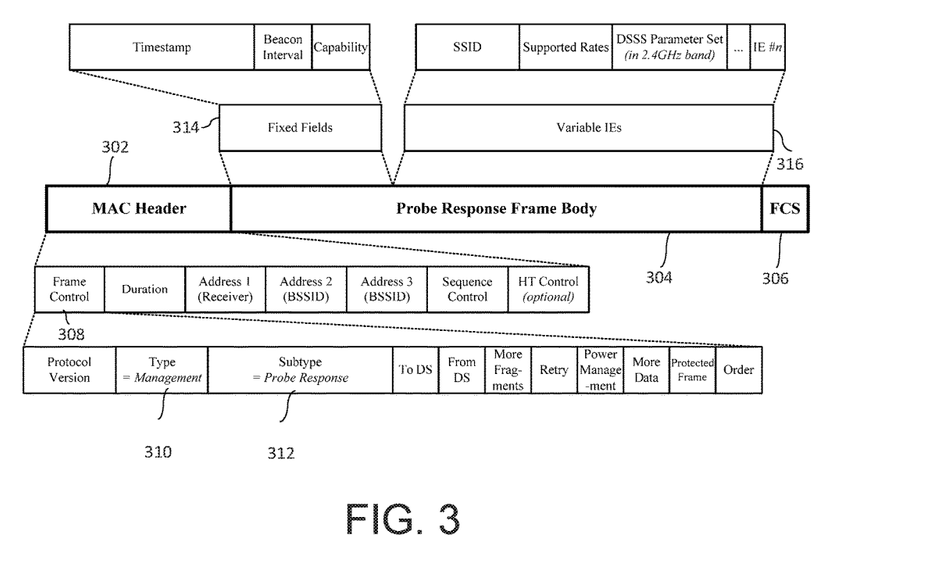
FIG. 3 is a diagram illustrating a format of a probe response frame.

Referring now to FIG. 3, a diagram illustrates a format of a probe response frame. Similar to the format of FIG. 1, the probe response frame includes a MAC header 302, a frame body 304, and an FCS 306. The first field within the MAC header 302 is a frame control 308, which specifies a type 310 and a subtype 312 of the frame. The frame body 304 starts with a sequence of fixed fields 314 followed by a series of variable IEs 316.

Different devices may include different IEs in their probe response frames depending on their capabilities and configurations. There may also be variations depending on the content of the probe request frame that is being responded to. Specifically, the probe request frame may include a request element providing a list of additional IEs to be returned.

Some assumptions can be made about the IEs within the probe response frame. The most important IEs, such as, for example, the SSID and supported rates, are required to be present in a particular order as specified by the IEEE 802.11 standard. Thus, the most important IEs can always be found at known locations within the frame body. The IEs included by a particular device for a specific BSS will generally not vary between different probe response frames, except within the vendor specific IEs and the requested IEs that appear after those specified by the standard. No changes are allowed to the presence or content of IEs between retransmissions of the same probe response frame.

With respect to passive scanning, the beacon frame is the most important management frame subtype. Like probe response frames, beacon frames also provide details of a particular BSS, such as, for example, its SSID. However, rather than being unicast when solicited by probe request frames, beacon frames are broadcast periodically.

Each BSS is configured with its own beacon interval, which is typically set to 100 TUs, where each TU is 1,024 microseconds, resulting in a beacon interval of 102.4 ms. The one device that is responsible for transmitting the next beacon frame calculates a target beacon transmission time (TBTT), which is one beacon interval after the previous TBTT. After the TBTT, the device will attempt to transmit a beacon, although a variable delay may exist due to contention accessing the wireless medium or implementation issues, such as, for example, accuracy of the device's clock.

Figure 4:
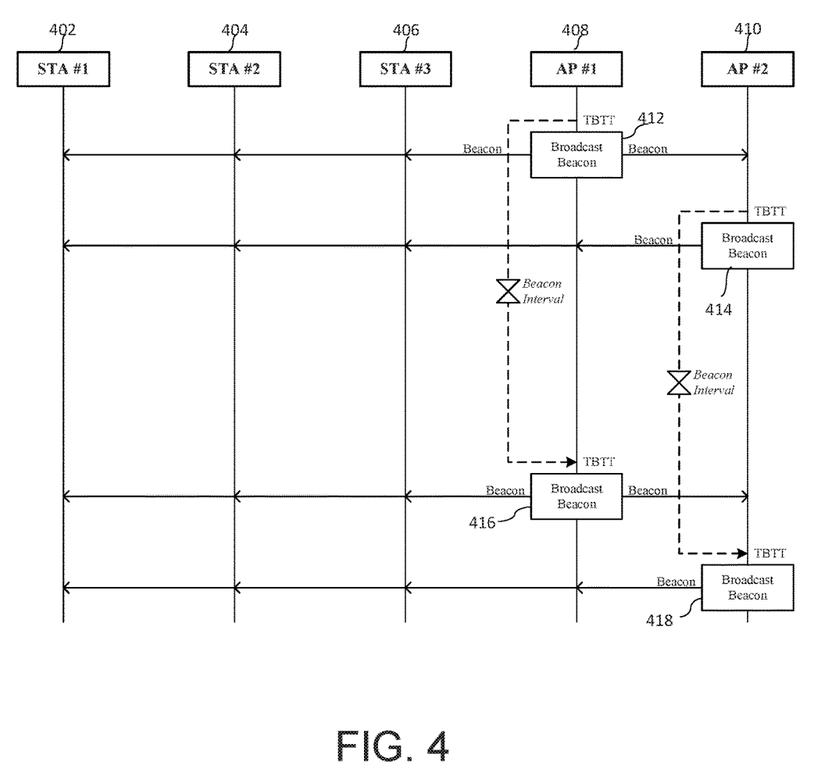
FIG. 4 diagram illustrating beacon transmission by access points (APs)

FIG. 4 is a diagram illustrating beacon transmission by APs. A first AP 408 broadcasts a first beacon 412 to each of a first station 402, a second station 404, a third station 406, and a second AP 410. The second AP 410 broadcasts a second beacon 414 to each of the first station 402, the second station 404, the third station 406, and the first AP 408. After one beacon interval from its first TBTT, the first AP 408 broadcasts a third beacon 416 to each of the first station 402, the second station 404, the third station 406, and the second AP 410, at the next TBTT. Similarly, after one beacon interval from its first TBTT, the second AP 410 broadcasts a fourth beacon 418 to each of the first station 402, the second station 404, the third station 406, and the first AP 408, at the next TBTT.

Figure 5:
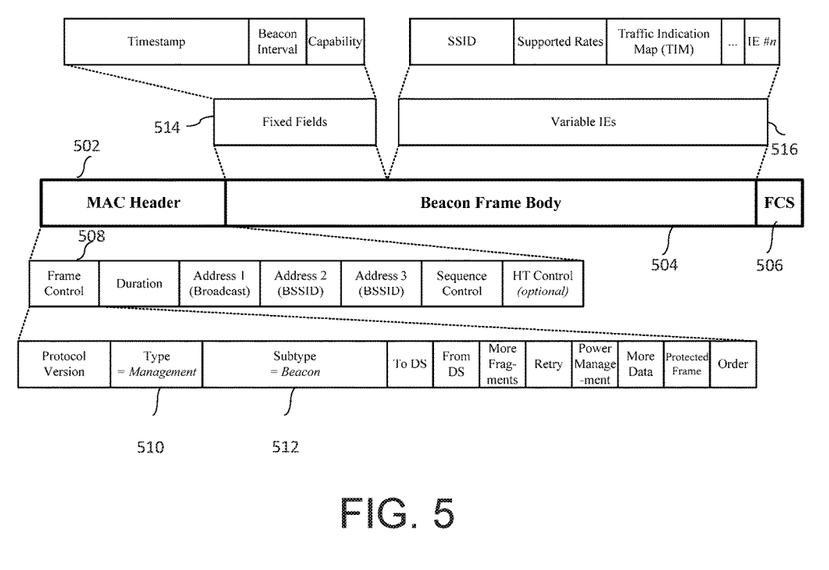
FIG. 5 is a diagram illustrating structure of a beacon frame.

FIG. 5 is a diagram illustrating a structure of a beacon frame. Beacon frames have a structure similar to that of probe response frames. The structure illustrated in FIG. 5 is for an AP operating at 5 GHz that does not support a point coordination function (PCF). A 2.4 GHz AP would also include a direct sequence spread spectrum (DSSS) parameter set element between the supported rates and the traffic indication map (TIM).

Specifically, the beacon frame includes a MAC header 502, a frame body 504, and an FCS 506. The first field within the MAC header 502 is a frame control 508, which specifies a type 510 and a subtype 512 of the frame. The frame body 504 starts with a sequence of fixed fields 514 followed by a series of variable IEs 516.

As with probe response frames, different devices may include different IEs in their beacon frames depending on their capabilities and configurations. There may also be variations depending on the operating conditions. For example, a channel switch announcement is included if the AP is about to switch to a different operating channel because a radar signal has been detected. The length of some IEs may also vary between successive beacon frames for the same BSS. For example, the length of the TIM will depend on the devices for which the AP has data buffered.

The IEEE 802.11 standard specifies that frames received with an invalid FCS should be discarded. However, these partially received frames often contain useful information despite the errors.

Frames that are received with valid PHY preamble/headers but invalid FCS will typically still have a substantial portion of their MAC header and frame body bits correct. Depending on the nature of the impairment, errors may either be grouped in blocks (corresponding to bursts of interference) or distributed throughout a frame (if its signal to interference plus noise ratio (SINR) was generally poor). More commonly, there is a combination of both effects. Specifically, some segments of the frame will have nearly 100% of bits correct, and other portions will have a much higher percentage of errors.

Figure 6:
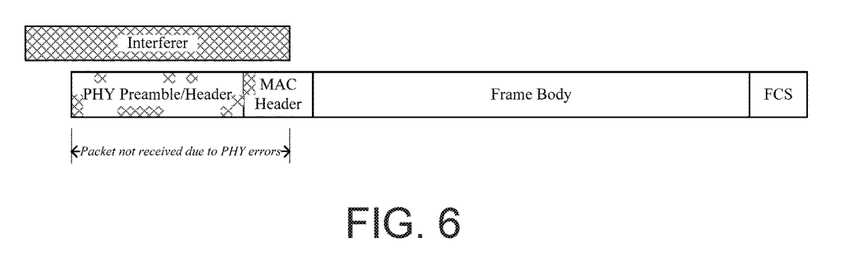
FIGS. 6-8 are diagrams illustrating relationships between an interferer and a frame.
Figure 7:
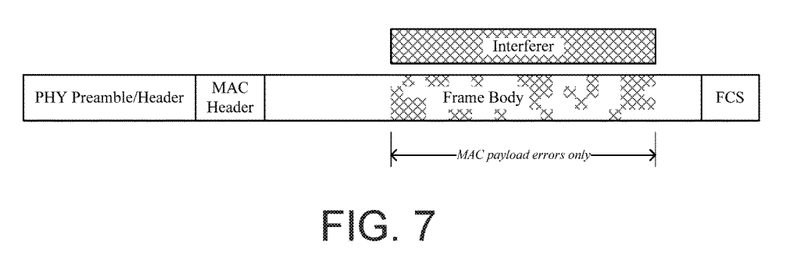
Figure 8:
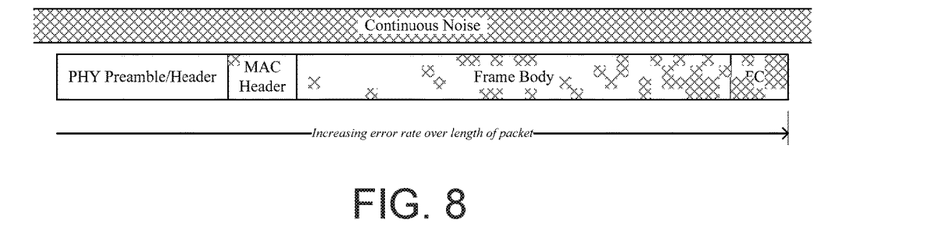

The MAC header of a partially received frame has a significantly higher probability of its bits being correct than the frame body does, especially when operating in a congested environment. FIGS. 6-8 are diagrams illustrating a relationship between an interferer and a frame. As shown in FIG. 6, if the errors are predominantly caused by bursts of interference that are present at the start of the frame, the receiver would likely be unable to detect the PHY preamble or would encounter errors in the PHY header, thereby preventing reception of the whole packet.

However, as shown in FIG. 7, if the interference starts later, errors will be introduced in the parts of the frame coinciding with the interference. This situation may be caused by an interferer causing receiver saturation or analog to digital converter (ADC) clipping (since the receiver gains will be locked at this stage), or simply due to degraded SINR.

As shown in FIG. 8, low SINR may result in a receiving modem making a poor estimate of the symbol clock and channel at the start of the frame. This will result in an increase in aggregate sampling and equalization errors through the frame (although this may be partially mitigated if the receiving modem tracks the timing and channel).

Thus, if the PHY preamble/header for a received frame appears to be valid, then there is a high probability that the MAC header was correctly received, even if the FCS does not match. The contents of the MAC header can therefore be used to identify candidates for partial packet recovery (PPR).

The frame body has a higher probability of containing errors, but there is still likely to be some data that is correctly decoded. Useful information can be recovered from these partially received frames.

During scanning, a device may receive probe response frames in response to the device's own probe request, or may receive probe response frames addressed to other devices in response to the probe requests of the other devices. In both cases there may be retransmissions of the probe request until its transmitter sees a positive acknowledgement, or until the appropriate retry limit is reached. The only difference is which device transmits the ACK frames, and hence the likelihood of retransmission stopping before a particular device has correctly received the probe response.

As described above, frames received with incorrect FCS are typically discarded. However, it is possible to attempt recovery of data within probe response frames if multiple versions are received with errors in different locations. Specifically, if at least three probe response frames have been received from a particular BSS then it is possible to implement N-modular redundancy (majority logic) decoding as a simple form of forward error correction (FEC), to recover portions of the original frame without receiving a correct FCS.

The first step is to select the set of partially received probe response frames over which N-modular redundancy decoding is attempted. The minimal requirement is that all probe response frames are from the same BSSID. Frames from a BSSID for which the required information has already been obtained during the current scan (e.g., frames received without FCS errors or frames from a prior partial packet recovery) can be excluded to save processing and storage. Various other restrictions can be applied to simplify the implementation or reduce the processing and storage requirements.

The simplest approach for selecting the candidate probe response frames is to use adjacent transmissions of the same frame. This approach can be achieved by requiring an exact match of the MAC header (excluding the retry bit field and the duration/ID field) with the immediately preceding received packet, and discarding any previous partially received packets if the MAC headers do not match. However, this approach does not accommodate retransmissions of different frames being interleaved (which is common in congested environments), or errors in the MAC headers itself.

In an enhanced approach for selecting the candidate probe response frames, a cache is maintained of multiple different probe response frames being recovered. Any new partially received probe response frame is added to a cache indexed by a combination of the BSSID (or transmitter address (TA)) and the frame's length. With the exception of independent BSS (IBSS) and mesh BSS (MBSS), the TA (address 2) and BSSID (address 3) fields in probe response frames should have the same value. If the values of the TA and BSSID fields are different due to errors, the frame can be indexed under the value of both fields. If a probe response frame is successfully recovered, the cache entries matching that BSSID should be flushed since it is not longer necessary to attempt recovery. Any further partially received probe response frames for that BSSID can be excluded from partial packet recovery.

Figure 9:
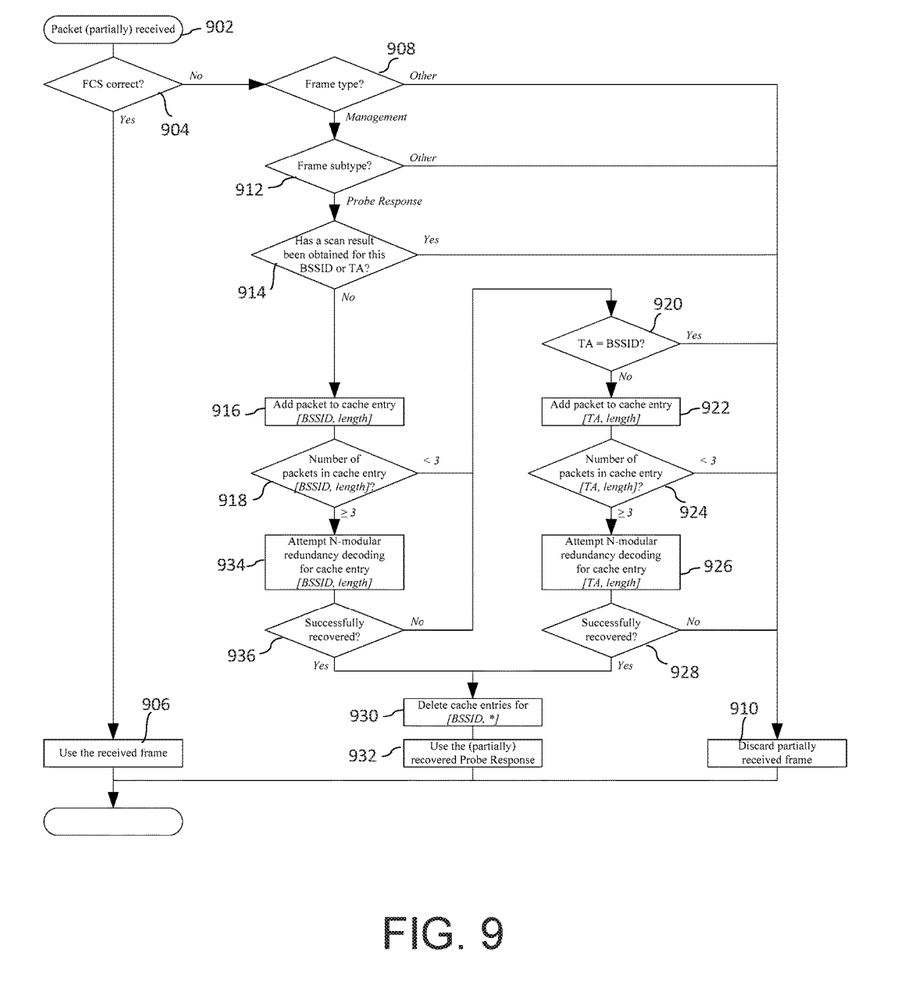
FIG. 9 is a flowchart illustrating candidate probe response frame selection, according to an embodiment of the present disclosure.

FIG. 9 is a flowchart illustrating candidate probe response frame selection, according to an embodiment of the present disclosure. A packet or frame is partially received, in step 902. In step 904, it is determined whether the FCS of the partially received frame is correct. If the FCS is correct, the received frame is used, in step 906. If the FCS is not correct, the frame type is determined, in step 908. If the frame type is something other than a management frame, the partially received frame is discarded, in step 910.

If the frame type is the management frame type, the subframe type is determined, in step 912. If the subframe type is something other than a probe response frame, the partially received frame is discarded, in step 910. If the subframe type is a probe response frame, it is determined whether a scan result has been obtained for the BSSID or the TA, in step 914. If a scan result has been obtained, the partially received frame is discarded, in step 910.

If a scan result has not been obtained, the packet is added to a cache using its BSSID as a first value and its length as a second value, in step 916. In step 918, it is determined whether the number of packets in the cache having the same first and second values is greater than or equal to 3.

If the number of packets in the cache having the same first and second values is less than 3, it is determined whether the TA is the same as the BSSID, in step 920. The BSSID and TA should typically be identical in probe response frames, but may differ in a given probe response frame due to errors in that frame. If the TA and the BSSID are the same, the partially received frame is discarded, in step 910. If the TA and the BSSID are not the same, the packet is added to the cache using its TA as the first value and its length as the second value, in step 922. In step 924, it is determined whether the number of packets in the cache with the same first and second values is greater than or equal to 3. If the number of packets is less than 3, the partially received frame is discarded, in step 910. If the number of packets is greater than or equal to 3, N-modular redundancy decoding is attempted for the packets of the cache having the same first and second values, in step 926. In step 928, it is determined whether a frame is successfully recovered. If the frame is not successfully recovered, the partially received frame is discarded, in step 910. If the frame is successfully recovered, the cache entries corresponding to the first value (BSSID or TA) are deleted, in step 930, and the recovered probe response frame is used, in step 932.

Returning to step 918, if the number of packets in the cache having the same first and second values is greater than or equal to 3, N-modular redundancy decoding is attempted for the packets of the cache having the same first and second values, in step 934. In step 936, it is determined whether a frame is successfully recovered. If the frame is successfully recovered, the cache entries corresponding to the first value (BSSID or TA) are deleted, in step 930, and the recovered probe response frame is used, in step 932. If the frame is not successfully recovered, the methodology continues at step 920, as described above.

Alternate caching strategies may also be employed, which may vary by the choice of indexes and the mechanism by which old cache entries expire.

The N-modular redundancy decoding can be applied to arbitrary groupings of bits. The corresponding bits in each of the received versions of the frame are compared, and the value for each group that occurs in the most versions is selected.

With respect to the comparison of the corresponding bits in each frame, if there is no single value for one or more groups that occurs more often than others, then additional versions of the frame need to be received before that segment of the original frame can be recovered. A group size of an octet (8 bits) aligns the decoding to field and IE boundaries, and allows an efficient software implementation. Use of a smaller group size, down to individual bits, will increase the probability of being able to recover the frame from a certain number of received versions, but also significantly increases the required processing. Larger group sizes are also possible, but will have less ability to accommodate errors distributed throughout the received frames.

N-modular redundancy is a form of repetition code. Use of repetition codes is not normally recommended due to poor channel efficiency. Repetition codes offer a worse compromise between data rate and bit error rate than other error correcting codes. However, in embodiments of the present disclosure, the repetition codes take advantage of the repetition that occurs as part of the IEEE 802.11 standard's normal ARQ mechanism, resulting in fewer retransmissions than would otherwise be necessary. The repetition codes are not adding duplication that would not otherwise occur.

The content of an original probe response transmission and the content of its subsequent retransmissions are mostly identical, with the only exceptions being the retry flag within the MAC header's frame control field (which is 0 on the first transmission and 1 for all retransmissions), the duration/ID field (which will depend on the expected modulation rate for the ACK response, and may increase if the rate is reduced for retransmission), the timestamp field (which is updated with the timing synchronization function (TSF) value at the time of each retransmission), the FCS (which is recalculated based on the changed fields), and possibly some vendor specific IEs.

Probe response frames for a particular BSS that are not retransmissions of the same original frame may contain additional differences. The receiver address (address 1) field within the MAC header is set to the intended recipient of the frame (i.e., the device that transmitted the probe request frame for which the probe response frame is being sent), and the sequence control field is updated with a new sequence number. The IEs that are included may be different, although it is rare that there will be a difference except within the vendor specific IEs and requested IEs that appear at the end of the frame body. The value (and possibly length) of some IEs may also vary, but this is unlikely within IEs that are most important during scanning.

Fields that are expected to vary between the frames should be ignored during the N-modular redundancy decoding. The retry flag can be handled by masking out that bit (i.e., forcing it to a constant value), or by ignoring the whole frame control field. Other fields and IEs with variable but fixed-length content can be excluded in their entirety. IEs whose presence is optional or that have variable length can be handled either by excluding the first such IE and all IEs after that point in the frame, or by only attempting N-modular redundancy on frames that have matching IEs as indicated by the overall frame body length. It is possible that two probe response frames will have the same frame body length by having differences in the length of their constituent IEs, but this is rare for frames for the same BSSID. It is also beneficial to ignore any fields having values that are not required. This minimizes the required processing and does not block detection of successful recovery on the ability to recover unnecessary data.

The only fields or IEs that are typically essential during scanning are the BSSID (from address 2 or address 3), the SSID, and for 2.4 GHz networks, the DSSS parameter set. All other fields and IEs can be ignored during partial packet recovery.

Figure 10:
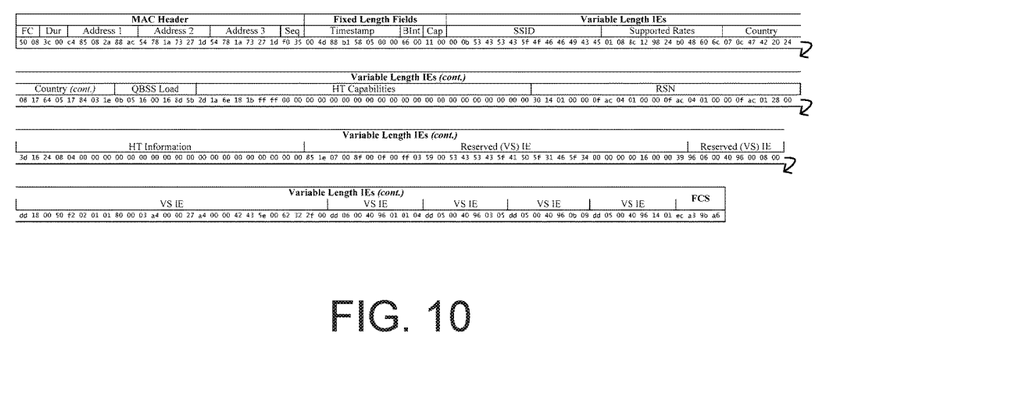
FIG. 10 is a diagram illustrating a probe response frame from a 5 GHz high throughput (HT) AP.

FIG. 10 is a diagram illustrating a probe response frame from a 5 GHz high throughput (HT) AP.

Figure 11:
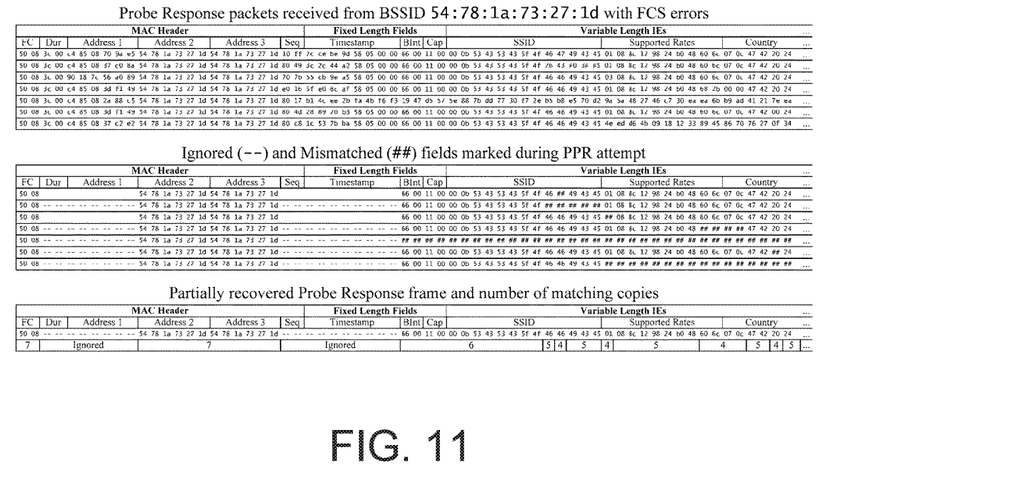
FIG. 11 is a diagram illustrating data recovery using seven frames that have FCS errors, according to an embodiment of the present disclosure.

Multiple probe response frames from the AP are collected using a wireless sniffer. FIG. 11 is a diagram illustrating the initial 65 octets of seven frames that have FCS errors in the version received by the sniffer. All of the probe response frames were transmitted by the same AP (as indicated by the address 2 and address 3 fields), but they were unicast to six different STAs (indicated by the address 1 field). Partial packet recovery is performed across these received frames using 7-modular redundancy on an octet-by-octet basis, with the values of the duration/ID, address 1, sequence control, timestamp, and FCS fields ignored. As shown in FIG. 11, all of the partially received frames had the retry bit set in their frame control field because the sniffer failed to receive any of the original transmissions. However, in general, the retry bit is ignored for N-modular redundancy decoding.

Successful recovery of the frame can be detected by applying a threshold to the minimum number of matching copies for each of the groups on which N-modular redundancy was applied. For example, at least $(n+1)/2$ matches are required based on n received frames, where $n \geq 3$. In the example of FIG. 11, at least four matching copies were received for all non-ignored segments, thereby providing reasonable confidence that the recovered data is correct. While there is a small possibility of a false positive with this criterion, occasional errors during scanning are generally tolerable and will be detected when a connection to the BSS is subsequently attempted.

Additional confidence in the recovered data can be achieved by substituting the recovered data into each of the partially received frames and recalculating their FCS. If the recalculated FCS matches the FCS field in the frame, the entire frame was successfully recovered, including the fields and IEs that were ignored (not recovered) during the partial packet recovery process. However, this is only possible if at least one of the frames was received without any errors within the ignored fields. If this approach is used, then in order to maximize the probability of successful recovery, the number of fields and IEs that are ignored should be minimized to only those expected to have variable contents.

In a preferred approach, both techniques are combined. If an FCS match is achieved, the recovered frame is used as though it had been successfully received originally. Otherwise, only the recovered fields are used.

Figure 12:
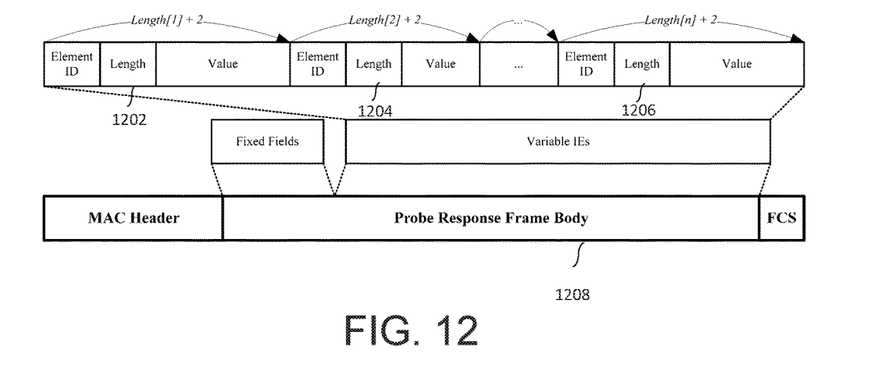
FIG. 12 is a diagram illustrating exclusion of variable length, variable position, or optional fields, according to an embodiment of the present invention.

FIG. 12 is a diagram illustrating exclusion of variable length, variable position, or optional fields, according to an embodiment of the present invention. If any IEs that are of interest during scanning are likely to occur after variable length or optional IEs, then it is not possible to determine their locations without parsing the frame's payload. However, in a partially received frame, the payload is likely to contain errors. These IEs can be located and extracted by attempting N-modular redundancy decoding on the whole frame, until a chain of IE length fields 1202, 1204, 1206 can be followed to the end of a frame body 1208 and the number of matching copies for their preceding element IDs have passed a threshold check. The element IDs can then be filtered against a list of IEs, either those that are expected to have static values, or those whose values are required if present in the probe response frame. It is safer to use a whitelist of IEs rather than a blacklist because there are many vendor-specific IEs and new IEs keep being added in amendments.

If a probe response frame addressed to the local device is successfully recovered, it may be positively acknowledged regardless of whether any copy was received with a correct FCS. If the latency of the partial packet recovery process is sufficiently low, this acknowledgement could be in response to the final partially received frame that contributed to the N-modular redundancy decoding, but it will more likely be for the following (unnecessary) retransmission instead (based on a match of the MAC header against the recovered frame). This avoids wasting further capacity of the wireless medium.

A variation of the N-modular redundancy recovery of probe response frames can also be applied to partially received beacon frames. The key difference from probe response frames is that beacon frames are broadcast, so each is only transmitted once. However, each BSS transmits beacon frames at regular intervals, and these typically only differ within a limited number of fields that are not usually required during scanning.

The partial packet recovery process for beacon frames requires two changes from that used for probe response frames. The first change is that the method used to collect suitable partially received frames must be modified, and the second change is that different fields need to be ignored or handled specially.

A typical passive scan only dwells on each channel for slightly longer than the expected beacon interval, i.e., just long enough to have the opportunity to receive a single beacon frame from each BSS. However, use of the N-modular redundancy decoding to recover data from beacon frames with errors requires a minimum of three partially received beacon packets from each BSS. These could be obtained by simply increasing the dwell time on each channel until sufficient packets have been obtained (or a copy of the beacon frame is received without errors). Alternatively, the packets could be collected across successive scans.

A more efficient approach is to return to the channel when another beacon frame from the target BSS is expected, either based on the beacon interval in the packets received up to that point, or by assuming the de facto standard of 100 TUs (relative to the time that the previous beacon frame for that BSS was received, less an allowance for any medium contention). This process can interleave a collection of additional beacon frames on multiple channels to minimize the overall elapsed time, or if there is sufficient time between successive capture attempts then the radio can be switched off to save power. This should be repeated until each beacon frame is correctly received, sufficient partially received frames have been collected for PPR to be completed successfully, or the maximum scan duration is reached.

Figure 13:
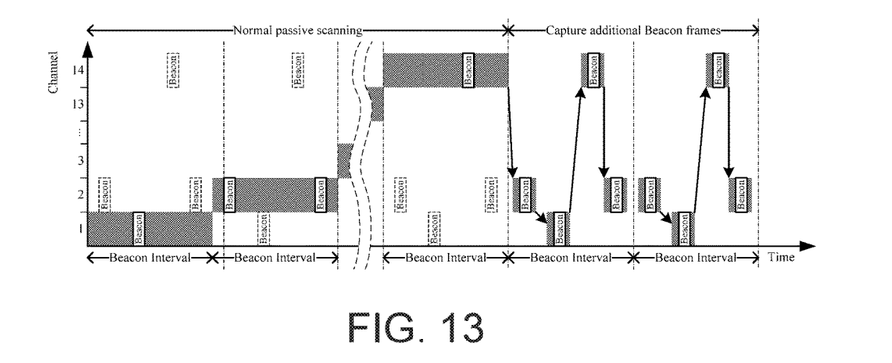
FIG. 13 is a diagram illustrating a passive scan across 14 channels at 2.4 GHz, according to an embodiment of the present disclosure.

FIG. 13 is a diagram illustrating a passive scan across 14 channels at 2.4 GHz, according to an embodiment of the present disclosure. Shaded regions indicate the dwell time on each channel.

The interleaving of beacon frame collection for different BSSs requires a cache of partially received beacon frames, which is similar to that described above for probe response frames, except that it needs to be maintained between scans of different channels. The cache should be similarly indexed by a combination of the BSSID (or TA) and the frame's length.

The IEEE 802.11 standard includes a special case for APs using space time block coding (STBC), which can transmit dual beacon frames during each beacon interval. A first beacon frame is transmitted using non-STBC modulation, and a second beacon frame is transmitted using STBC modulation. These can be treated independently by adding the STBC beacon field within the beacon's HT operation IE as an additional cache index, or they can be treated together by looking for beacon frames spaced at half the normal beacon interval.

Everything that occurs prior to the traffic information map (TIM) IE in a beacon frame transmitted by a particular BSS will have the same length and appear at the same offset within the frame payload. The only values that should change in the initial fields and IEs are the MAC header's sequence control field (which should be updated with the next sequence number for group addressed traffic) and the timestamp field (which is set of the TSF value at the time of each transmission). The TIM IE may vary in length depending on the STAs for which the AP has data buffered, which then affects the offset at which other IEs appear. There may also be differences in the values, lengths, or even presence, of IEs that occur after the TIM IE.

The simplest approach for performing N-modular redundancy decoding across multiple beacon frames is to exclude the sequence control field, the timestamp field, and all IEs from the TIM IE to the end of the frame. Amongst other things, this will provide the BSSID, SSID, and for 2.4 GHz BSSs, the DSSS parameter set, which is the essential information during scanning.

If the values of the other IEs are required then it may be sufficient to only attempt N-modular redundancy decoding on partially received frames that have the same frame body length. The TIM IE typically only varies over a small range of lengths, and other IEs are less likely to change length between successive beacon frames from the same BSS than between those from different BSSs.

The partial packet recovery techniques may be implemented in a variety of ways, such as through dedicated hardware or on a digital signal processor (DSP). However, the preferred approach is to implement the techniques in software using a central processing unit (CPU) and memory that is responsible for the scanning functionality within the MAC layer.

Figure 14:
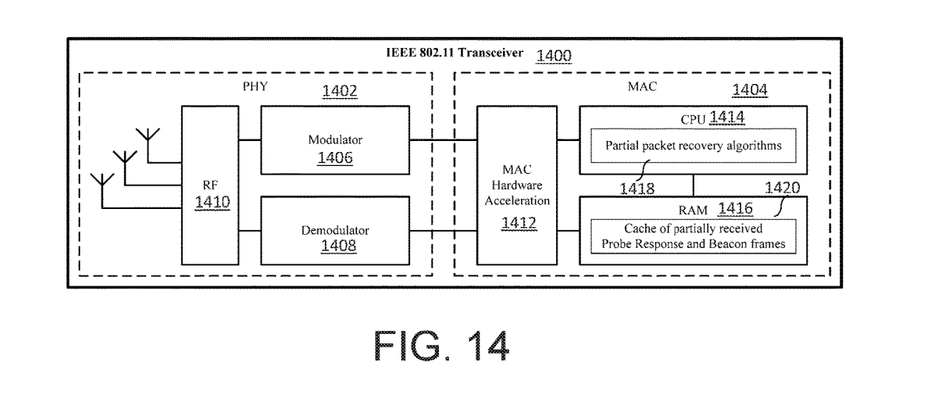
FIG. 14 is a diagram illustrating a transceiver or apparatus, according to an embodiment of the present disclosure.

FIG. 14 is a diagram illustrating a transceiver or apparatus, according to an embodiment of the present disclosure. A transceiver 1400 includes a PHY layer 1402 and a MAC layer 1404. The PHY layer 1402 includes a modulator 1406, a demodulator 1408, and a radio frequency (RF) unit 1410. The MAC layer 1404 includes MAC acceleration hardware 1412, a CPU 1414, and a random access memory (RAM) 1416. The CPU 1414 includes partial packet recovery algorithms 1418, while the RAM 1416 includes a cache or partially received probe response and/or beacon frames 1420.

During scanning, the CPU and memory will typically be less utilized than when sustaining peak data throughput, so there will be spare capacity that can be utilized without increasing the hardware cost.

The hardware implementation may be further implemented in accordance with input/output devices, a network interface, and a computer bus.

It is to be understood that the term "processor" or "CPU" may refer to more than one processing device and that various elements associated with a processing device may be shared by other processing devices.

The term "memory", as used herein, is intended to include a memory associated with a processor or CPU, such as, for example the RAM, a Read Only Memory (ROM), a fixed memory device (e.g., a hard drive), a removable memory device, a flash memory, etc.

In addition, the phrase "input/output devices", as used herein, is intended to include, for example, one or more input devices for entering information, and/or one or more output devices for outputting information.

Still further, the phrase "network interface", as used herein, is intended to permit a transceiver to communicate with another transceiver via an appropriate communications protocol.

Software components including instructions or code for performing the methodologies described herein, may be stored in one or more of the associated memory devices (e.g., ROM), and when ready to be utilized, loaded in part or in whole (e.g., into the RAM) and executed by a CPU. Specifically, a non-transitory computer readable medium may be provided with computer executable instructions stored thereon and executed by a processor to perform the methods of embodiments of the present invention.

Partial packet recovery of a probe response frame or a beacon frame can be used as a trigger to transmit a unicast probe request in order to obtain any fields or IEs of interest that were not successfully recovered.

The techniques described for probe response and beacon frame recovery could be applied to other frame types that are transmitted multiple times, and not just during scanning. Other management frame subtypes do not include a timestamp field, and should have identical payload contents in retransmissions (except for vendor specific IEs), which simplifies the partial packet recovery process.

The partial packet recovery techniques could take advantage of additional information from the receiver to identify how much different portions of the received frames should be trusted. For example, a demapper could indicate how close each symbol is to the ideal constellation, or an FEC decoder could indicate how many bits have been corrected. The information could be provided with various degrees of granularity, e.g., for each symbol or decoded octet, or for arbitrary sized blocks. This can be used to reduce the threshold for determining successful recover if the error rate is very low. It could also be used to attempt recovery with a minimum of two partially received frames by taking the value of each segment with the lowest error probability.

The N-modular redundancy techniques could also use the received coded data bits, i.e., the deinterleaved/demapped soft-decoded symbols prior to binary convolutional code (BCC) or low-density parity check (LDPC) decoding. The soft decision weighting can be used to combine the data from multiple partially received packets, with FEC decode and descrambling performed on the recovered data. This requires significantly more storage and processing but is likely to further reduce the number of partially received packets that are required.

Embodiments of the present disclosure improve robustness of WLAN scanning in congested environments beyond the performance achievable using existing techniques. The embodiments improve robustness without requiring any changes to the IEEE 802.11 standard or to the devices being discovered, and thus, can be used with existing devices. There is no overhead in using the embodiments described herein if frames are received without errors. When packet errors exist, the embodiments of the present disclosure improve the reliability of scanning or reduce power consumption without increasing the number of frames that are transmitted.

The present disclosure may be utilized in conjunction with the manufacture of integrated circuits, which are considered part of this invention.

While the disclosure has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for recovering data transmitted to a terminal, the method comprising:
    receiving, by a transceiver of the terminal, a probe response frame with an incorrect frame check sequence;
    adding, by a processor of the terminal, the probe response frame to a cache, wherein the probe response frame is indexed by a first value of the probe response frame and a second value of the probe response frame;
    if a number of frames having matching first and second values is greater than or equal to three, selecting, by the processor, the number of frames from the cache as the plurality of frames;
    comparing, by the processor, corresponding values, for each of a plurality of bit sets, in the plurality of candidate frames, wherein specified fields of the plurality of candidate frames are excluded from comparison; and
    recovering, by the processor, the data based on the comparison.

2. The method of claim 1, wherein the terminal is based on Institute for Electrical and Electronics Engineers (IEEE) 802.11 standard.

3. The method of claim 1, wherein the plurality of frames are consecutive retransmissions of a probe response frame with matching medium access control headers, excluding a retry bit and a duration/ID field.

4. The method of claim 1, wherein adding the probe response frame to the cache comprises:
    adding the probe response frame to the cache using a basic service set identifier of the probe response frame as the first value and a length of the probe response frame as the second value;
    determining whether the number of frames in the cache having matching first and second values is greater than or equal to three;
    when the number of frames in the cache having matching first and second values is less than three, and the basic service set identifier and a transmitter address of the probe response frame differ:
    adding the probe response frame to the cache using the transmitter address as the first value and the length of the probe response frame as the second value; and
    determining whether the number of frames in the cache having matching first and second values is greater than or equal to three.

5. The method of claim 1, wherein comparing the corresponding values comprises comparing values of bit sets expected to include the same values, and excluding bits sets expected to have different values from the comparison.

6. The method of claim 5, wherein only values of a basic service set identifier, a service set identifier, and a direct sequence spread spectrum parameter set, if present, are compared.

7. The method of claim 1, wherein recovering the data of the frame comprises:
    determining whether a minimum number of matching values exists for a given bit set among the plurality of candidate frames, wherein the minimum number is based on a number of the plurality of frames;
    if the minimum number of matching values exists, selecting a matched value as data for the given bit set; and
    repeating the determining and selecting steps for each bit set to be compared.

8. The method of claim 7, further comprising:
    substituting the selected matched values into each of the plurality of frames;
    calculating a frame check sequence for each of the plurality of frames;
    determining whether any of the calculated frame check sequences match a frame check sequence field in the plurality of frames; and
    if the calculated frame check sequence matches the frame check sequence field, selecting the matched values as the recovered data.

9. The method of claim 1, wherein, after recovering the data, further comprising excluding additional fields that are expected to change by:
    following a chain of length fields for at least one of variable length fields and optional fields to an end of a payload of the recovered data; and
    filtering identifiers of the at least one of variable length fields and optional fields against a list of field identifiers expected to have static values or required to be present in a probe response frame.

10. An apparatus for recovering data transmitted to a terminal, the apparatus comprising:

a transceiver;
a memory configured to store received frames; and
a processor coupled to the memory and the transceiver, wherein the processor is configured to:
  control the transceiver to receive a probe response frame with an incorrect frame check sequence;
  add the probe response frame to a cache, wherein the probe response frame is indexed by a first value of the probe response frame and a second value of the probe response frame;
  select the number of frames from the cache as the plurality of frames if a number of frames having matching first and second values is greater than or equal to three;
  compare corresponding values, for each of a plurality of bit sets, in the plurality of candidate frames, wherein specified fields of the plurality of candidate frames are excluded from comparison; and
  recover the data based on the comparison.

11. The apparatus of claim 10, wherein the plurality of the frames are consecutive retransmissions of a probe response frame with matching medium access control headers, excluding a retry bit and a duration/ID field.

12. The apparatus of claim 10, wherein the plurality of the frames are probe response frames having matching first and second values, where the first value comprises a basic service set identifier or a transmitter address and the second value comprises a probe response frame length.

13. The apparatus of claim 10, wherein the processor is further configured to compare values of bit sets expected to include the same values, and exclude bits sets expected to have different values from the comparison.

14. The apparatus of claim 13, wherein only values of a basic service set identifier, a service set identifier, and a direct sequence spread spectrum parameter set, if present, are compared.

15. The apparatus of claim 10, wherein the processor is further configured to:
  determine whether a minimum number of matching values exists for a given bit set among the plurality of candidate frames, wherein the minimum number is based on a number of the plurality of frames;
  select a matched value as data for the given bit set if the minimum number of matching values exists; and
  repeat the determining and selecting steps for each bit set to be compared.

16. The apparatus of claim 15, wherein the processor is further configured to:
  substitute the selected matched values into each of the plurality of frames;
  calculate a frame check sequence for each of the plurality of frames;
  determine whether the calculated frame check sequence matches a frame check sequence field in the plurality of frames; and
  if the calculated frame check sequence matches the frame check sequence field, select the matched values as the recovered data.

17. A non-transitory computer readable medium with computer executable instructions stored thereon executed by a processor to perform a method of recovering data transmitted to a terminal, the method comprising:
  receiving a probe response frame with an incorrect frame check sequence;
  adding the probe response frame to a cache, wherein the probe response frame is indexed by a first value of the probe response frame and a second value of the probe response frame;
  if a number of frames having matching first and second values is greater than or equal to three, selecting the number of frames from the cache as the plurality of frame;
  comparing corresponding values, for each of a plurality of bit sets, in the plurality of candidate frames, wherein specified fields of the plurality of candidate frames are excluded from comparison; and
  recovering the data based on the comparison.

* * * * *